(12) United States Patent
Mamyshev

(10) Patent No.: US 7,986,885 B2
(45) Date of Patent: Jul. 26, 2011

(54) METHOD AND APPARATUS FOR CONTROL OF DPSK AND DQPSK RECEIVERS AND TRANSMITTERS

(75) Inventor: Pavel Mamyshev, Morganville, NJ (US)

(73) Assignee: Mintera Corporation, Acton, MA (US)

( * ) Notice: Subject to any disclaimer, the term of this patent is extended or adjusted under 35 U.S.C. 154(b) by 960 days.

(21) Appl. No.: 11/509,489

(22) Filed: Aug. 24, 2006

(65) Prior Publication Data

US 2007/0047954 A1    Mar. 1, 2007

Related U.S. Application Data

(60) Provisional application No. 60/710,749, filed on Aug. 24, 2005.

(51) Int. Cl.
*H04B 10/04* (2006.01)

(52) U.S. Cl. ........ 398/188; 398/140; 398/195; 398/198; 398/209

(58) Field of Classification Search .............. 398/188, 398/33, 204, 203, 202, 186, 185, 192, 195, 398/196, 209, 140
See application file for complete search history.

(56) References Cited

U.S. PATENT DOCUMENTS

| | | | |
|---|---|---|---|
| 4,288,785 A * | 9/1981 | Papuchon et al. ............. 341/111 |
| 5,125,100 A | 6/1992 | Katznelson | |
| 5,625,652 A | 4/1997 | Petranovich | |
| 5,805,321 A * | 9/1998 | Ooi et al. ......................... 398/98 |
| 6,072,615 A * | 6/2000 | Mamyshev ................... 398/185 |
| 6,233,085 B1 * | 5/2001 | Johnson ......................... 359/245 |
| 6,407,845 B2 * | 6/2002 | Nakamoto ..................... 359/239 |
| 7,253,943 B2 * | 8/2007 | Kim et al. ...................... 359/326 |
| 7,266,306 B1 * | 9/2007 | Harley et al. .................. 398/182 |
| 7,389,055 B1 * | 6/2008 | Rickard et al. ................ 398/206 |
| 7,418,211 B2 * | 8/2008 | Akiyama et al. .............. 398/198 |
| 2002/0005975 A1 * | 1/2002 | Nakamoto ..................... 359/254 |
| 2002/0141694 A1 | 10/2002 | Caplan et al. | |
| 2003/0175036 A1 * | 9/2003 | Mamyshev et al. ........... 398/188 |
| 2003/0175037 A1 | 9/2003 | Kimmitt et al. | |
| 2004/0184819 A1 * | 9/2004 | Vassilieva et al. ............ 398/188 |
| 2004/0210790 A1 | 10/2004 | Moon et al. | |
| 2005/0046843 A1 | 3/2005 | Doerr et al. | |
| 2005/0117191 A1 * | 6/2005 | Griffin .......................... 359/245 |
| 2006/0232848 A1 * | 10/2006 | Xu et al. ........................ 359/325 |

* cited by examiner

*Primary Examiner* — Ken N Vanderpuye
*Assistant Examiner* — Hibret A Woldekidan
(74) *Attorney, Agent, or Firm* — Nelson Mullins Riley & Scarborough LLP; Anthony A. Laurentano

(57) ABSTRACT

An optical communication device such as a transmitter or receiver has a control loop for controlling relative phase of two related optical signals based on signal peak intensity. An optical transmitter measures the signal peak intensity of a combined optical signal representing two data channels to adjust relative phase as desired. An optical receiver measures the signal peak intensity of combined electrical signals, single electrical signals or single optical signals to adjust relative phase as desired. Signal peak intensity is minimized or maximized by adjusting the relative phase, depending upon the modulation configuration used. The feedback control provides a consistent and robust control to stabilize the optical communication device in the presence of variables such as temperature changes, aging and manufacturing tolerances.

27 Claims, 16 Drawing Sheets

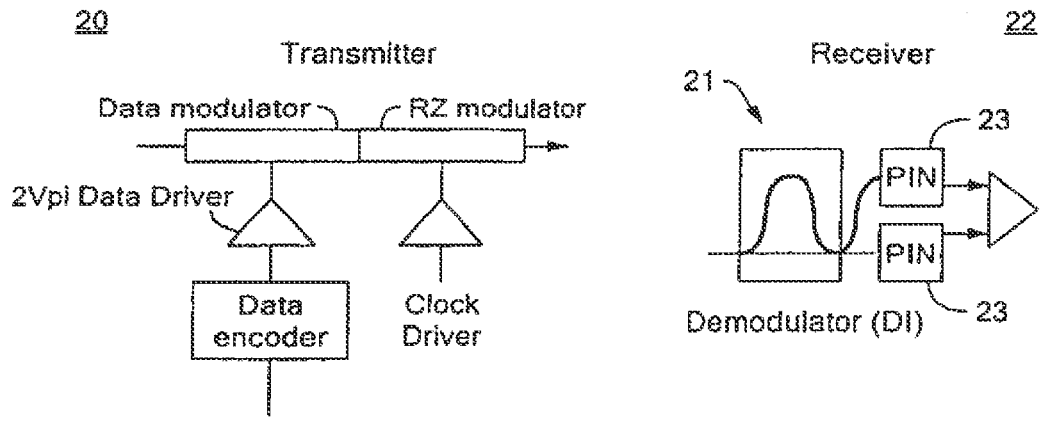
FIG. 1a
PRIOR ART
FIG. 1b
PRIOR ART
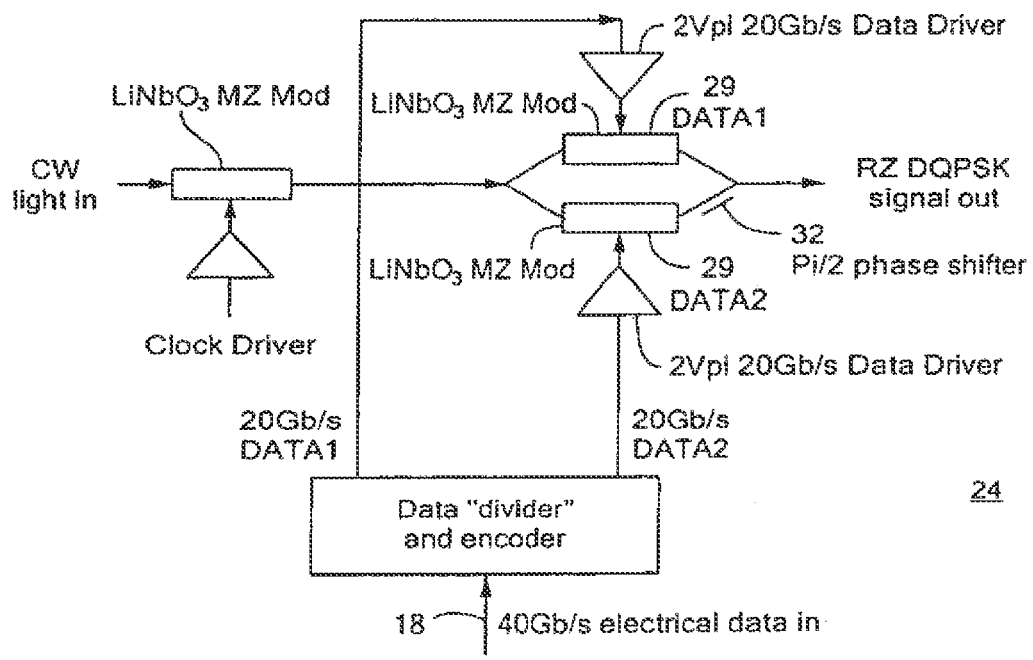
FIG. 2
PRIOR ART

US 7,986,885 B2

METHOD AND APPARATUS FOR CONTROL OF DPSK AND DQPSK RECEIVERS AND TRANSMITTERS

CROSS REFERENCE TO RELATED APPLICATIONS

This application claims benefit of U.S. Provisional Application No. 60/710,749 filed Aug. 24, 2005.

STATEMENT REGARDING FEDERALLY SPONSORED RESEARCH OR DEVELOPMENT (Not applicable)

BACKGROUND OF THE INVENTION

Differential Phased Shift Keying (DPSK, also known as Differential Binary Phased Shift Keying DBPSK) and Differential Quadrature Phased Shift Keying (DQPSK) are very attractive modulation formats for optical data transmission. When used with a balanced direct detection receiver, DPSK outperforms conventional on-off keying receiver sensitivity by approximately 3 dB. Dense Wavelength Division Multiplexing (DWDM) transmission up to 10,000 km has been demonstrated at 40 Gbit/s using DPSK modulation format. DQPSK has a symbol rate that is half of the data rate. For example, for a 43 Gb/s data rate, a 21.5 gigasymbol per second rate is used. As a result, DQPSK has a narrower spectral bandwidth, greater chromatic dispersion tolerance and greater tolerance with respect to polarization mode dispersion (PMD) than traditional formats or DPSK.

DPSK and DQPSK can be non-return-to-zero NRZ-type modulated or, if a return-to-zero (RZ) pulse carver is added to the transmitter, RZ-type modulated. RZ-type usually outperforms NRZ-type formats in performance based on optical signal-to-noise ratio (OSNR) sensitivity and robustness with respect to nonlinearity.

DPSK and DQPSK modulation formats require rather complicated transmitters and receivers. FIGS. 1-3 illustrate transmitters 20, 24 and receivers 22, 26 for DPSK and DQPSK modulation formats. For proper operation, transmitters 20, 24 and receivers 22, 26 should be properly tuned. For commercial use, control loops are implemented to contribute to proper tuning and to maintain proper conditions in the operation of transmitters 20, 24 and receivers 22, 26.

Optical receivers include asymmetric Mach-Zehnder interferometers, also commonly referred to as delay interferometers (DIs), which act as optical DPSK/DQPSK demodulators, and balanced photodetectors. The time delay between the two arms of the interferometer is approximately an integer number of the time symbol slots of the optical DPSK/DQPSK data signal:

$$\Delta t = n\, T \quad (1)$$

where n=1, 2, . . . T=1/B is the symbol slot, and B is the symbol bit rate. An optical demodulator converts the DPSK/DQPSK phase-modulated signal into an amplitude-modulated optical signal at one output and into an inverted amplitude-modulated optical signal at the other output. These signals are detected with a balanced detector that consists of two high-speed detectors such as PIN diodes 23, 27 illustrated in receivers 22, 26. The outputs of the detectors are electrically subtracted from each other, and the resultant electrical signal is sent to data recovery circuits.

For a DPSK receiver to operate properly, the asymmetric Mach-Zehnder interferometer or DI should be accurately phased-tuned or biased. DPSK receiver 22 uses one DI 21, and the optimum phase bias between the two arms is $\pi$ or 0. DQPSK receiver 26 uses two DIs 25, 28. One DI is tuned to a $+\pi/4$ bias, and the other DI is tuned to a $-\pi/4$ bias.

The modulators in DPSK and DQPSK transmitters 20, 24 also should be properly biased. Typical parameters known to influence modulator control include modulator biases, relative timing between the RZ pulse carving by the RZ modulator and the data modulation and a time alignment between the two data streams (for DQPSK transmitter 24). DQPSK transmitter 24 consists of two parallel Mach-Zehnder (MZ) modulators 29. The optical signals from modulators 29 are combined to produce an RZ DQPSK output. The proper relative optical phase or bias between these signals of $\pi/2$ is set by a phase shifter 32. In known systems, phase shifter 32 operates on the basis of optical power feedback.

SUMMARY OF THE INVENTION

Briefly described, the present disclosure provides a system and method for an improved control of optical transmitters and receivers to provide stable operation with changes in system parameters such as may be caused by temperature or aging. The disclosed system and method identifies and utilizes a peak intensity measurement of an output signal in the transmitter or receiver to optimize control settings for transmitter or receiver components.

According to an exemplary embodiment, bias settings for an optical communication device are controlled based on feedback influenced by output signal peak intensity. The output signal peak intensity provides a measurement dependent upon the phase difference between two optical data signals. Accordingly, the output signal peak intensity feedback is used to control the phase bias between two optical signals to optimize the phase difference. In one embodiment, the minimum output signal peak intensity determines the optimum bias settings for the phase difference between the two optical signals. In another embodiment, the maximum output signal peak intensity is used.

According to an aspect of the disclosed system and method, a dither tone applied to a phase shifter component controls the phase shift to obtain an improved phase difference stability. The dither tone can be developed based on the feedback from the optical communication device output applied to a voltage peak detector. The feedback may include a fast photodiode coupled to the output optical signal. Alternately, or in addition, the feedback signal can be an available electrical output from the optical communication device.

The present invention is applicable to DPSK and DQPSK transmitters and receivers, operating with RZ or NRZ modulation. Transmitters typically include an optical modulator, while receivers typically include an optical demodulator.

In the case of a DQPSK transmitter, the voltage peak detector signal generates bias control settings to adjust the phase shifter in one branch of the two data signals to minimize the output signal peak intensity. The appropriate bias applied to the phase shifter is $\pi/2$ or $3\pi/2$. The $\pi/2$ bias setting optimizes the phase difference of the two data branches, while the $3\pi/2$ bias setting corresponds to optimizing the inverted data.

In accordance with another exemplary embodiment, the feedback loop for optimizing phase difference between the two optical branches includes an RF power detector for measuring RF power in the spectral band between zero and the symbol rate frequencies. The RF power detector can detect midrange spectral components to determine if the modulation bias is correct. With incorrect modulation bias, a significant fraction of signal energy lies in midrange spectral components. Correct modulation produces an RF power signature with less concentrated energy in the midrange spectral components. The control loop can adjust phase bias settings to reduce the amount of energy in midrange spectral components to optimize system output.

According to another exemplary embodiment, the disclosed system and method optimizes operation of a DPSK receiver by inspection of a voltage peak detector feedback. A phase shifter bias is controlled to maximize the peak voltage at the output of the DPSK receiver. Optimum settings for the bias are 0, +π and −π. According to an aspect of the present invention, the stabilization phase bias is chosen based on one of the two maxima during calibration or system initialization.

According to another exemplary embodiment, the output of a DQPSK receiver is optimized on the basis of detection of a peak voltage feedback. The output voltage is applied to a voltage peak detector, which in turn supplies a proportional signal to phase bias electronics that control the phase shifter to attain an optimal phase shift. The DQPSK receiver includes two branches, and can have two separate voltage peak detectors and bias control for two different phase shifters in the separate branches. In the DQPSK receiver, the optimum phase shifter bias corresponds to a minima of the peak voltage detected in the feedback control loop. There are two minima at +π/4 and −π/4 corresponding to the two DI modulators, and another two minima at +3π/4 and −3π/4 that correspond to modulator settings for inverted data. The phase shifter bias applied by the feedback control loops seeks to adjust the phase shift to minimize the peak output voltage for each of the corresponding balanced receivers in the DQPSK receiver. The choice of the minima used to control the phase shift of the two DI demodulators may be chosen during calibration or receiver initialization.

According to an aspect of the disclosed system and method, an RF power detector may be used to control the phase shift bias to minimize the RF power related to the receiver output of the DQPSK receiver.

According to an advantage of the present invention, the peak voltage feedback signal may be obtained at an output of the balanced detector or at the optical output of one or more arms of the separate DI demodulators. The phase shift bias control may be based on voltage peak detection from a single optical arm of the balanced detector in the DQPSK receiver, or both optical arms. Alternately, or in addition, the peak voltage detection may be obtained at the electrical output of the different arms of the balance detector, or both arms together.

In accordance with another exemplary embodiment of the present disclosure, a feedback control loop for an optical transmitter or receiver uses a signal that is proportional to a data error rate to provide a bias for a phase shifter. The control loop attempts to adjust the bias on the phase shifter to minimize the signal proportional to the data error rate. The data error rate may be taken from a Forward Error Correction (FEC) chip, for example. The control loops using the signal that is proportional to the data error rate are active in different time slots in a time division multiplexing (TDM) type system to avoid interference between control loops for two separate DI demodulators.

BRIEF DESCRIPTION OF THE DRAWINGS

The disclosed system and method are described in greater detail below, with reference to the accompanying drawings, in which:

FIGS. 1a, 1b illustrate a DPSK transmitter and receiver, respectively;

FIG. 2 is a schematic block diagram of an RZ DQPSK transmitter;

DETAILED DESCRIPTION OF THE DRAWINGS

The entire contents of U.S. Provisional Application No. 60/710,749, filed Aug. 24, 2005, are hereby incorporated herein by reference.

Figure 3:
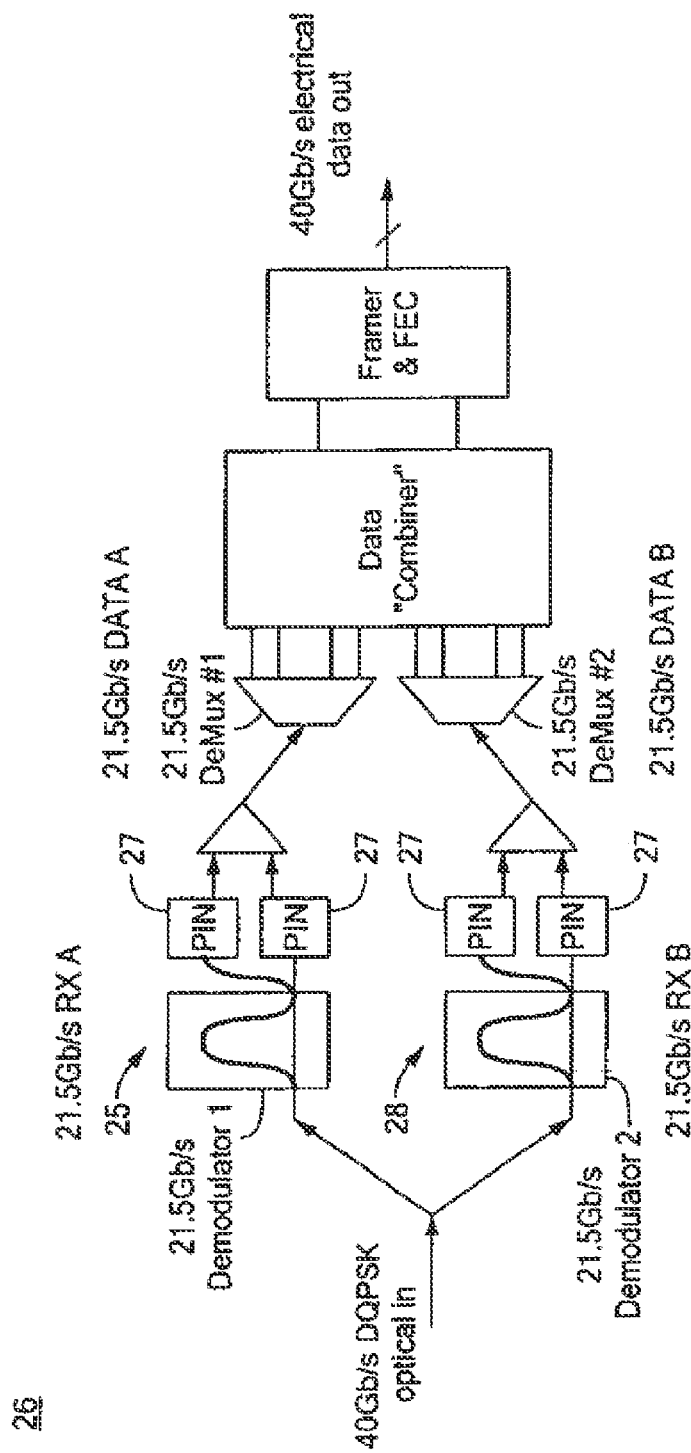
FIG. 3 is a schematic block diagram of an RZ DQPSK receiver.
Figure 4:
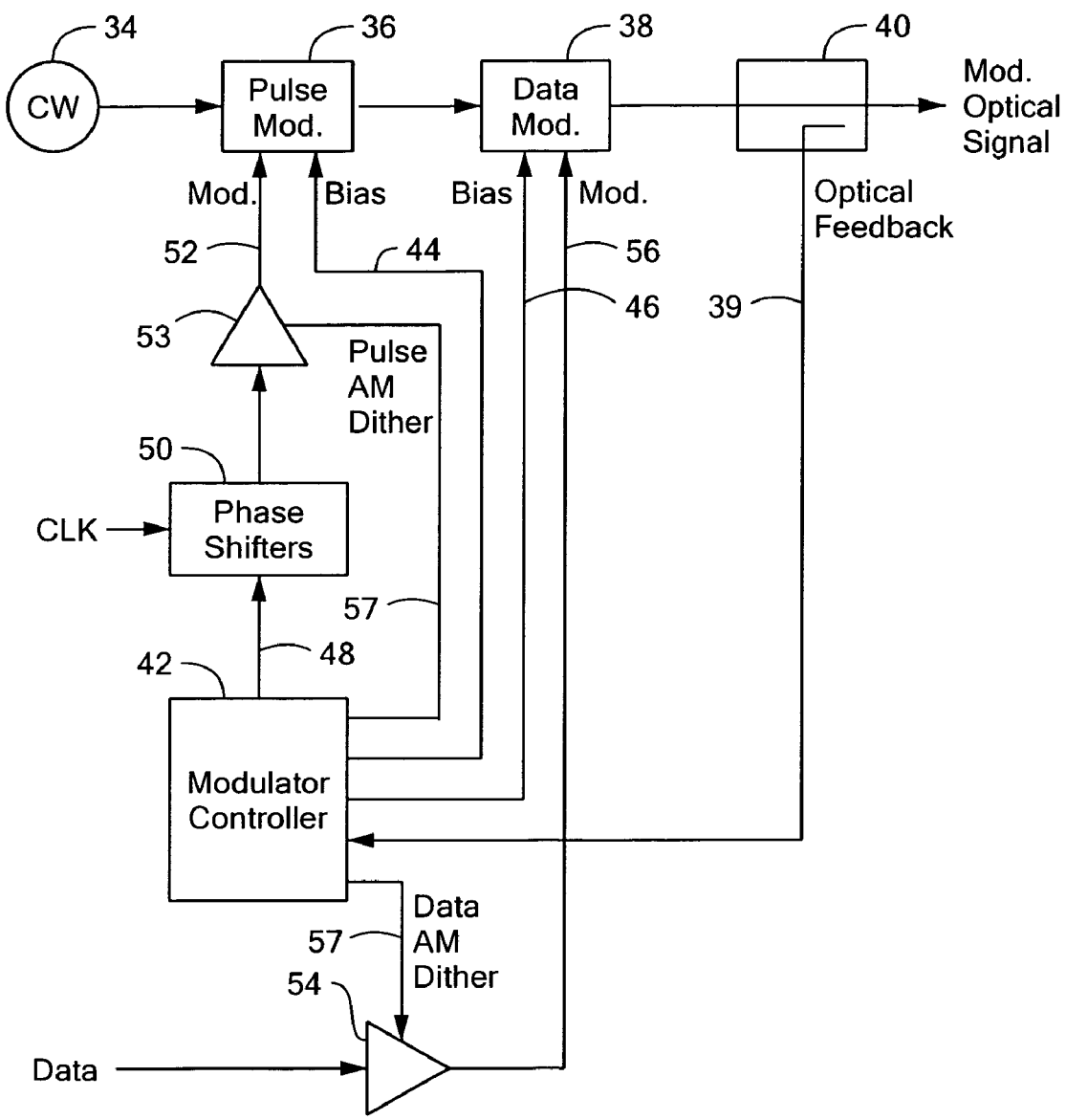
FIG. 4 is a block diagram of a known optical transmitter.

Referring now to FIG. 4, a diagram of an optical transmitter with a pulse modulator 36 and a data modulator 38 is shown. An optical feedback signal 39 provides control information to modulator controller 42. Modulator controller 42 provides three control signals related to producing the modulated optical signal. A pulse bias control signal 44 provides bias control to pulse modulator 36, a data bias control signal 46 provides bias control to data modulator 38 and a phase control signal 48 provides phase control for phase shifters 50.

In general, modulator controller 42 monitors output optical power in optical feedback 39 and maintains a desired value for data bias signal 46, pulse bias signal 44 and phase control signal 48. Modulator controller 42 sets bias signals 44 and 46 and phase control signal 48 using a series of dithers to produce and maintain an optimal optical waveform over temperature, aging and other drift inducing characteristics. One way to measure the optimal optical waveform is to provide a low Bit Error Rate (BER) at the receiver to which the modulated optical signal is provided. Fluctuations in output optical power are influenced as a function of pulse bias 44, data bias 46 and phase control 48, to provide a three-dimensional basis for control of system operation in the optical transmitter of FIG. 4.

The disclosed system and method described below applies to DPSK and DQPSK transmitters and receivers, operating with RZ or NRZ modulation. Transmitters typically include an optical modulator, while receivers typically include an optical demodulator.

Figure 5:
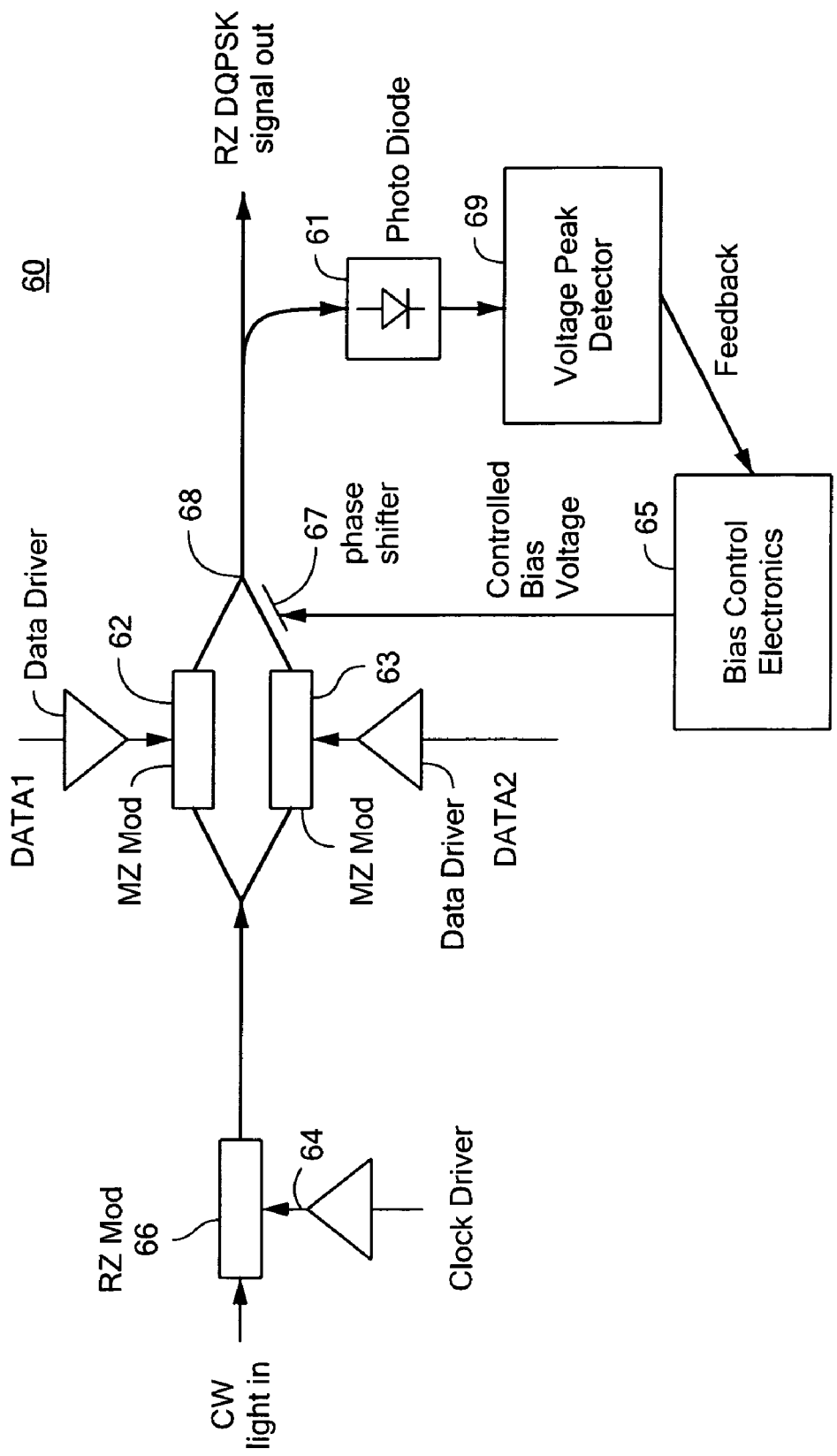
FIG. 5 is a schematic block diagram of an RZ DQPSK transmitter in accordance with the present invention.

Referring now to FIG. 5, additional control parameters for a DQPSK transmitter 60 are used beyond those used for the RZ DPSK transmitter illustrated in FIG. 4. Because there are two data inputs, DATA1 and DATA2, into data modulators 62, 63, respectively, there are two biases for the data modulators. In addition, there are two controls for pulse modulator 66, one for timing between clock signal 64 and input DATA1, and one for timing between clock signal 64 and input DATA2. These two controls are similar to RZ DPSK clock controls for pulse modulator 36 shown in FIG. 4 and may be omitted for an RZ or DPSK modulation.

In addition to the above-described signals and controls, a bias of $\pi/2$ between optical inputs DATA1 and DATA2 should be controlled to optimize transmitter performance. Furthermore, appropriate timing between input DATA1 and DATA2 at a data level should also be controlled. The control loops for DQPSK transmitter 60 are similar to those described for FIG. 4 with respect to the data modulator and the RZ timing in pulse modulator 66. In general, those control schemes use an optical power feedback to maintain appropriate bias settings. For example, referring to FIG. 4, if the driving voltage of data modulator 38 is less than approximately 1.53 $V\pi$, the correct bias setting corresponds to a minimum of optical power output versus bias. If the driving voltage for data modulator 38 is higher than approximately 1.53 $V\pi$, the correct bias setting corresponds to a maximum of optical energy output versus bias. In addition, RZ versus data timing in the optical transmitter of FIG. 4 is set to a maximum optical energy output. RZ pulse modulator 36 may be a Mach-Zehnder (MZ) modulator, which can be driven by a full clock rate sinusoidal signal. That is, the signal frequency can equal the data signal rate frequency. Alternately, the RZ modulator can be driven by a half-rate signal. In the case of the full clock rate signal, the RZ bias is set to a quadrature. In the case of the half clock rate signal, the RZ bias can be set to a minimum or to a maximum transmission point.

There are some advantages available in RZ DQPSK transmitter 60 illustrated in FIG. 5 over prior optical transmitters. Because there are two data modulators, additional timing slots may be added in the second modulator in a Time Division Multiplexing (TDM) scheme. Also, different dither tone frequencies may be used for the two different data modulators. In addition, timing control between the RZ pulse carving and data streams can be controlled in different ways. For example, the system may control the path delays for input DATA1 and input DATA2, while omitting control for the delay path in RZ modulator 66. Alternately, the system may control the delays for paths in RZ modulator 66 and input DATA1, while omitting control for the path delay in input DATA2.

A parameter that should be controlled in RZ DQPSK transmitter 60 is the phase difference between an optical DATA1 signal and an optical DATA2 signal. This parameter can be referred to generally as a data bias phase shift. The data bias phase shift, like other control parameters, depends upon a feedback value to stabilize or control variables in the system to produce the desired output. However, attempts to control the data bias phase shift using an optical power feedback, similar to other control parameters in the system, does not provide satisfactory control.

The concept of using average output optical power as the feedback appears to provide some stability in the control loop to maintain the phase shift at the desired value of $\pi/2$. For example, with the control loop set to achieve the maximum derivative of the average output optical power with respect to the controlled data bias phase shift, some desirable control parameters are achieved. In this type of control, a bias tone applied to a phase shifter obtains a control loop that minimizes the second harmonic frequency of the tone. However, the control loop feedback based on average output optical power is not as stable as desirable, due to the presence of random signal transmissions. When a random signal is transmitted, the average output optical power should be independent of the relative bias between the two data signals. Accordingly, because the average output optical power feedback does not provide a consistent control result in the presence of random signal transmissions, alternate control schemes with improved control stability would be desirable.

The disclosed system and method provide a technique for generating a feedback signal in an optical transmitter or receiver to achieve improved control of the phase difference between optical data signals applied to the transmitter or observed in the receiver. The disclosed system and method uses a combination of the two optical data signals to produce an optical signal that depends upon the mutual phase of the data signals. A schematic block diagram of the control loop in an RZ DQPSK transmitter 60 is illustrated in FIG. 5. Transmitter 60 is similar to transmitter 24 illustrated in FIG. 2, in which two different data paths are provided to encode a data stream 18. Referring to FIG. 5, the two different data streams DATA1 and DATA2 provide modulation for MZ modulators 62, 63 to produce optical data signals transmitted from transmitter 60. A phase shifter 67 controls the phase shift between the optical DATA1 and DATA2 signals. The desired phase shift for the RZ DQPSK transmitter 60 between optical data signals DATA1 and DATA2 is $\pi/2$. Maintaining this phase shift can be challenging with component tolerances, non-linearities, operational variations over temperature and age and other system variations that contribute to changing the phase relationship between optical data signals DATA1 and DATA2. Accordingly, a control loop for the phase difference between data signals DATA1 and DATA2 should be robust, consistent and be precise over a long term period to accommodate variations in system parameters.

Figure 6A:
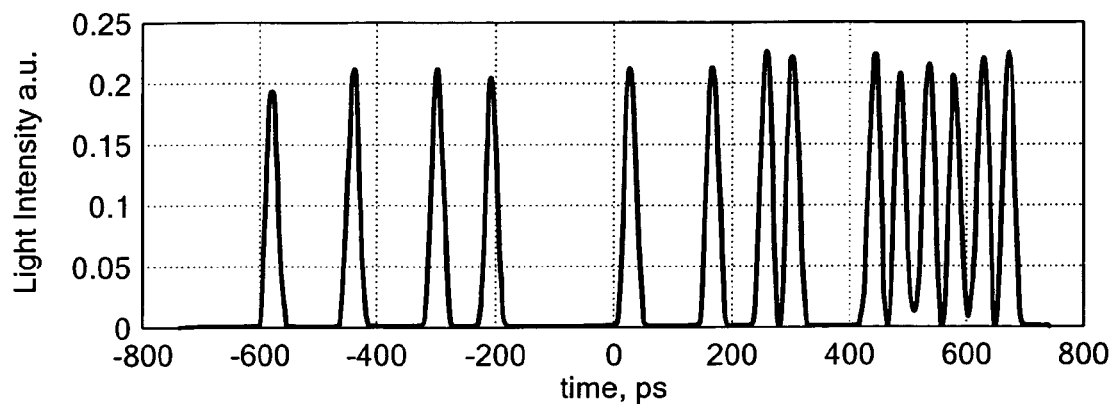
FIGS. 6a-6c are graphical plots of output light intensity versus time for an RZ DQPSK transmitter.
Figure 6B:
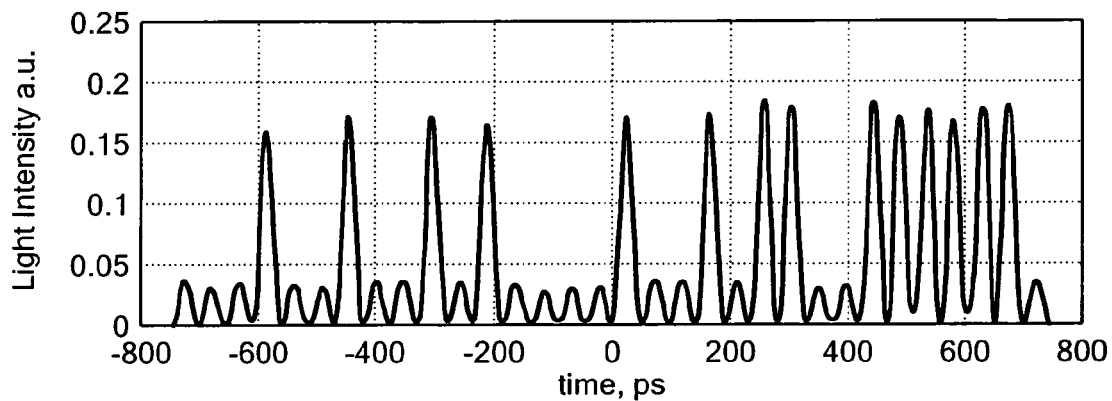
Figure 6C:
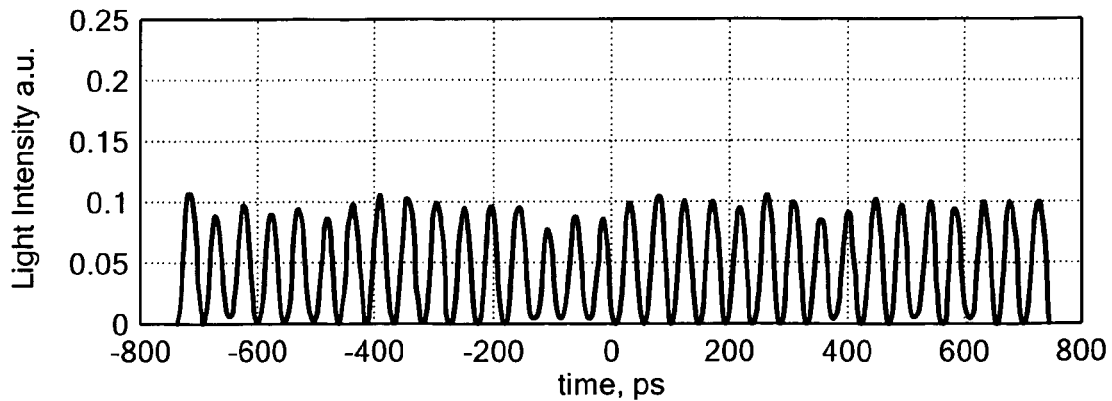

Various combinations of the two optical signals DATA1 and DATA2 were experimented with to attempt to obtain a desired control with an appropriate phase shift. Referring for a moment to FIGS. 6a-6c, various phase shifts between optical data signals DATA1 and DATA2 are illustrated. FIG. 6a is a graph illustrating light intensity output versus time for a phase shift that is 0 or $\pi$. In the light intensity peaks observed in FIG. 6a, the instantaneous optical fields interfere strongly with each other. Because the two input optical signals are phase modulated by the data streams, the resulting signal after combination of the streams is a strongly intensity modulated signal. A significant difference between the light intensity of various bits is observed. That is, while some bits have an intensity that is close to 0, other bits have an intensity that is approximately 4 times that of the signal bits prior to interference through the combination of optical data signals DATA1 and DATA2. That is, the optical data signals taken at the outputs of modulator 62, 63 have data bits that can be cancelled or multiplied when combined to interfere with each other at point 68 in FIG. 5.

Referring to FIG. 6b, a bias shift of $3\pi/4$ results in high peak intensities and low level signal bit intensities similar to the situation illustrated in FIG. 6a. The biases provided in FIGS. 6a and 6b illustrate how an inappropriate bias results in high signal peaks and low level signal bit values due to the interference of the signals and their respective phases.

Referring now to FIG. 6c, the light intensities resulting from the correct bias phase shift between optical data signals DATA1 and DATA2 is illustrated. This desired signal phase shift results in the intensities of all data bits being substantially closer to each other in magnitude. With the $\pi/2$ or $3\pi/2$ phase shift biases for the phase shift between the optical data paths, the instantaneous optical fields are orthogonal to each other. As a result, the instantaneous intensities of each data bit adds to each other during interference, so that the combined output produces data bit intensities that are approximately 2 times that of the signal intensities prior to combination. By observing the differences between the graph in FIG. 6c and those in FIGS. 6a and 6b, a control scheme might be envisioned that focuses on peak signal intensity values.

Figure 7:
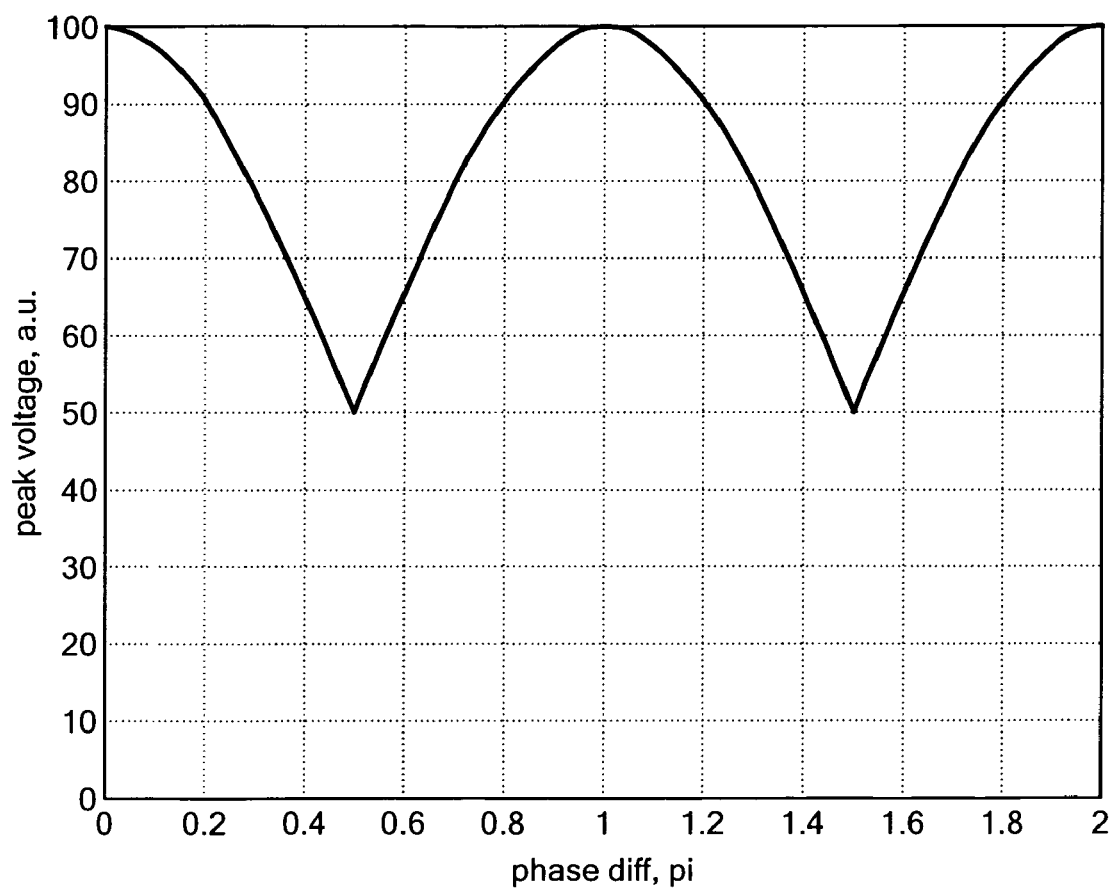
FIG. 7 is a graphical plot of output peak intensity voltage versus phase difference for a DQPSK transmitter.

Interestingly, the average optical power in each of the case of FIGS. 6a-6c are approximately the same. However, because of the differences in the peak signal intensities versus phase bias, a consistent and stable control may be realized based on the peak signal intensities. For example, an optimum bias setting, corresponding to $\pi/2$ or $3\pi/2$ for the phase difference between the data signals, can be controlled based on a minimum peak intensity of the combined data signals. This relationship is illustrated in FIG. 7. Accordingly, peak signal intensity may be used as a feedback to control the phase difference between the different data paths.

Referring again to FIG. 5, a feedback loop illustrating the use of a voltage peak detector 69 is illustrated. Voltage peak detector 69 obtains an input from photodiode 61, which converts optical signals to electrical signals in the feedback loop. Voltage peak detector 69 produces an indication of the output optical signal peak intensity, which is used by bias control 65 to control phase shifter 67 to minimize signal peak intensity. In practice, bias control 65 may produce a dither tone to be applied to phase shifter 67. Minimizing signal peak intensity should result in the desired phase shift of $\pi/2$ or $3\pi/2$.

Photodiode 61 may be a fast photodiode to contribute to maintaining an appropriate loop speed and stability. By minimizing the signal from voltage peak detector 69, transmitter 60 can maintain an appropriate phase difference of $\pi/2$ or $3\pi/2$ between the two optical data signals DATA1 and DATA2.

Referring now to FIG. 7, a graph of peak voltage versus phase difference for transmitter 60 is illustrated. The desired phase difference settings of $0.5\pi$ and $1.5\pi$ are observed as corresponding to minimums in the peak voltage. Accordingly, the control scheme that minimizes the peak voltage observed in the feedback loop provides the appropriate phase difference bias. The phase difference of $\pi/2$ corresponds to the non-inverted data, while the phase difference $3\pi/2$ corresponds to inverted data. The choice of bias of either $\pi/2$ or $3\pi/2$ for minimizing the feedback signal peak intensity may be made at calibration or during device initialization.

Another technique for identifying appropriate control loop settings for the bias on phase shifter 67 is to observe the RF spectra of the feedback signals. As indicated by FIGS. 6a-6c, the desired optical output has a very different RF spectra from the undesired optical output. The undesired optical output intensity signals have a strong intensity modulation and therefore contain a significant fraction of energy in midrange spectral components. The desired phase shift and resulting optical output intensity signals do not have a large fraction of energy in the midrange spectral components. Accordingly, voltage peak detector 69 illustrated in FIG. 5 may be replaced with an RF power detector that measures RF power in a spectral band between zero and the symbol rate frequencies. The RF power measured by the detector can be minimized to obtain the appropriate phase shift bias for controlling phase shifter 67.

One advantage provided by the disclosed system and method is that there is no requirement to modify timing between data inputs DATA1 and DATA2 at a data level. That is, the actual data information provided by data paths DATA1 and DATA2 need not be shifted or modified in accordance with the present invention. The timing between input data paths DATA1 and DATA2 at a data level can be set during calibration or during device initialization, and is then maintained with the control loops related to RZ modulation and data modulation.

Figure 8:
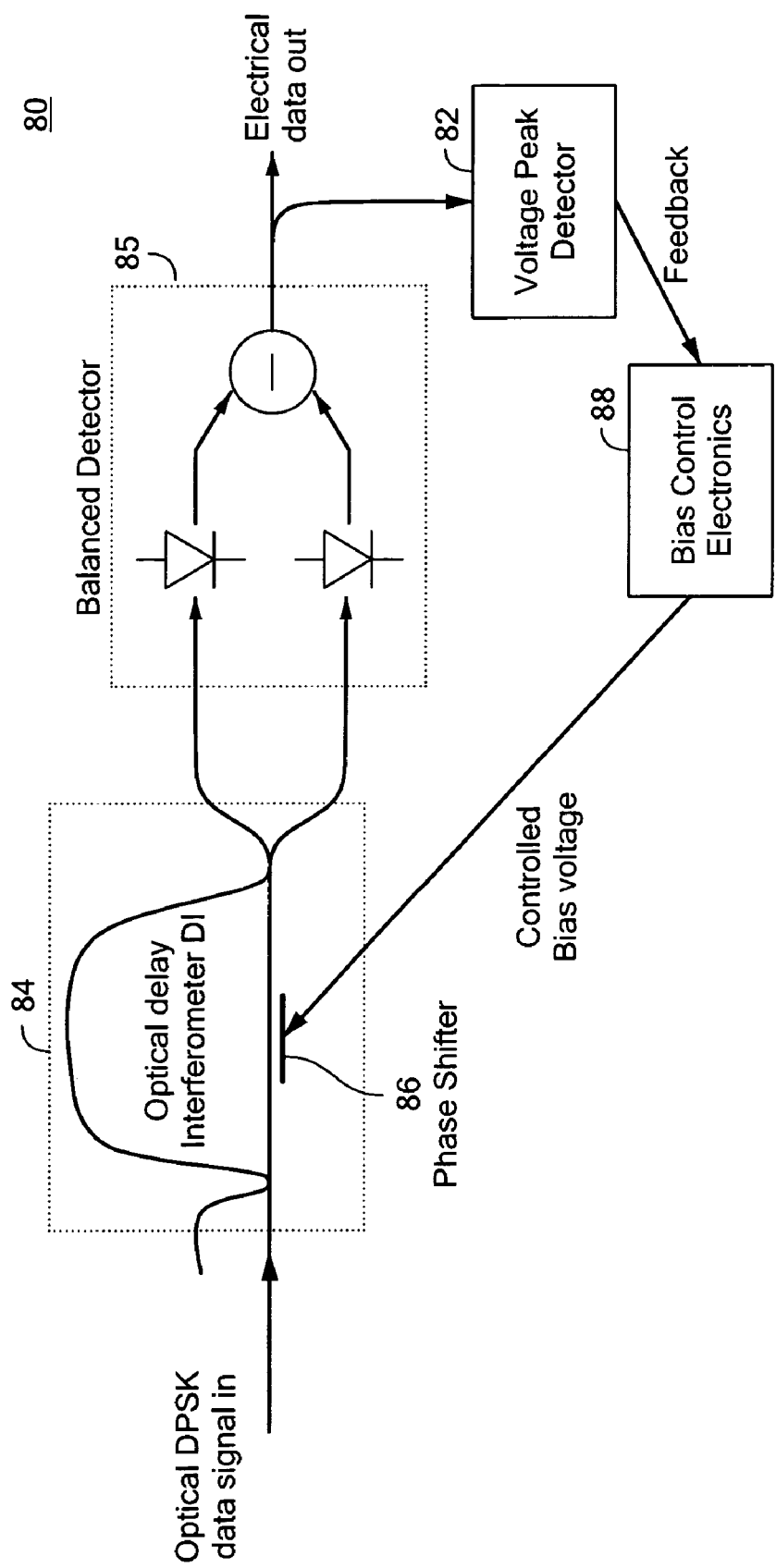
FIG. 8 is a schematic block diagram of a DPSK receiver with a feedback control loop in accordance with the present invention.

Referring now to FIG. 8, a DPSK receiver 80 is illustrated with a voltage peak detector 82 in accordance with the present invention. Tunable DI 84 includes a phase shifter 86 for tuning through the application of a voltage from bias control 88. The actual control of the phase shift in DI 84 may be achieved with a number of techniques, including heating a portion of the mechanism of DI 84 or changing an optical path characteristic through stretching/compressing a material with a piezoelectric element, among other available techniques. Receiver 80 demodulates an input optical DPSK data signal, and should have an optimized phase shift control to appropriately deconstruct the input data signal with DI 84. In accordance with the present invention, an output electrical signal from balanced detector 85 is applied to voltage peak detector 82 to produce a feedback signal that may be used by bias control 88 to appropriately control phase shifter 86. The use of voltage peak detector 82 permits the determination of the appropriate control to apply to phase shifter 86 to maintaining the desired phase shift in DI 84.

Figure 9:
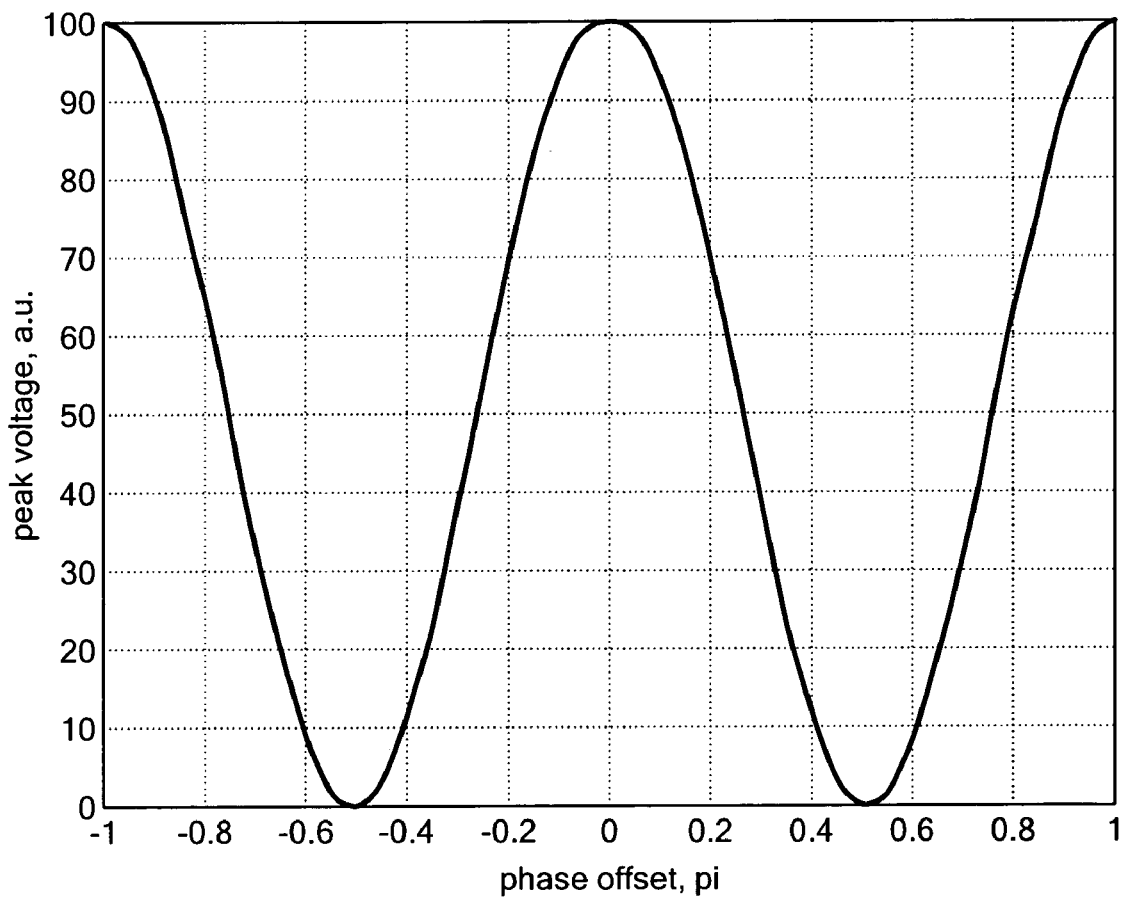
FIG. 9 is a graphical plot of output peak intensity voltage versus phase difference for a DPSK balanced detector.

Referring to FIG. 9, a graph of peak voltage versus phase offset is illustrated. For DPSK receiver 80 illustrated in FIG. 8, the optimum bias settings for phase shifter 86 are 0, $+\pi$ and $-\pi$. The graph in FIG. 9 demonstrates that the desired operational points for phase shifter 86 depends upon the points at which the peak voltage intensity at the output of balance detector 85 is maximized. The maximums of 0, $+\pi$ and $-\pi$ correspond to the non-inverted data and the inverted data, one of which can be chosen during calibration or device initialization. By maximizing the output peak voltage intensity of the receiver of FIG. 8, the appropriate phase shift for DI 84 can be maintained. Accordingly, a practical implementation of a control loop for the phase shift bias in DI 84 can be provided.

In addition to using the output voltage peak intensity, receiver 80 may also use an RF power detector to produce a signal that can be maximized. As described above, if phase shifter 86 operates at a point away from the desired phase offset, the output voltage peak intensity or RF power changes to produce an indication of the appropriate control to be applied to phase shifter 86. In the case of the voltage peak intensity, a maximum is desired. In the case of the RF power detector, it is desirable to maximize RF power. Maximum RF power is generally obtained when the two optical pathways in DI 84 are appropriately shifted in phase so that each of the combined signal bits add up with constructive interference.

Figure 10:
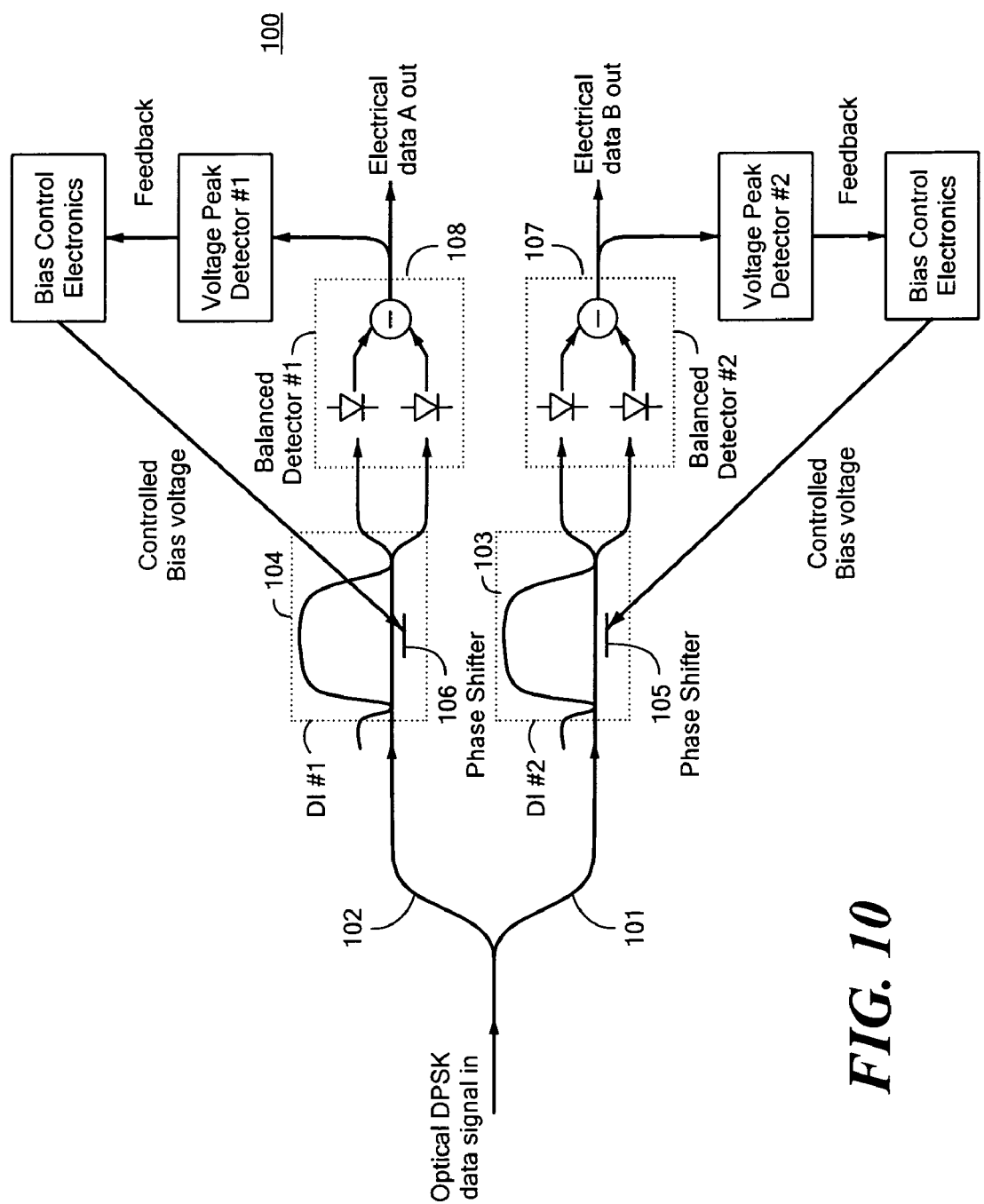
FIG. 10 is a schematic block diagram of a DQPSK receiver with feedback signals taken from outputs of balanced detectors.

Referring now to FIG. 10, a DQPSK receiver 100 is illustrated. Receiver 100 includes two DIs 103, 104, with controllable phase shifters 105, 106, respectively. Each branch 101, 102 of receiver 100 has a separate control loop that operates similarly to receiver 80 in FIG. 8. Accordingly, a voltage peak intensity feedback is used to control phase shifters 105, 106 from each of the separate electrical outputs of balanced detectors 107, 108, respectively.

Figure 11A:
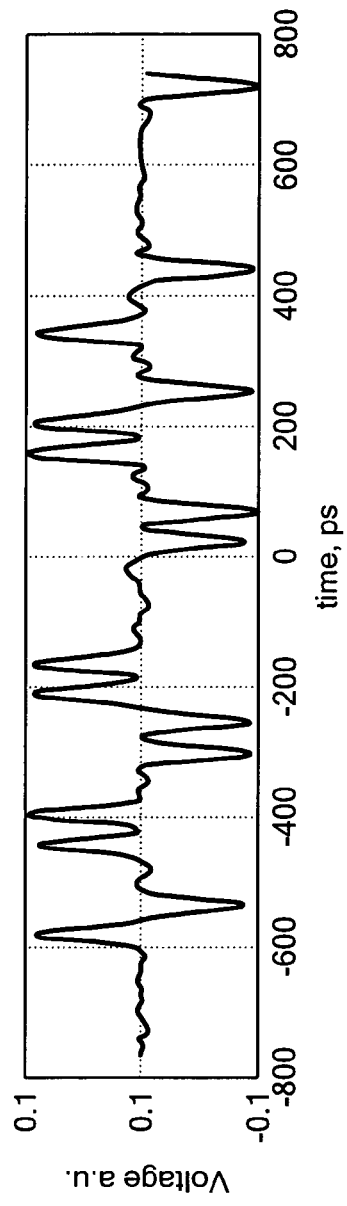
FIGS. 11a-11c are graphical plots of output signal voltage versus time for an RZ DQPSK balanced detector.
Figure 11B:
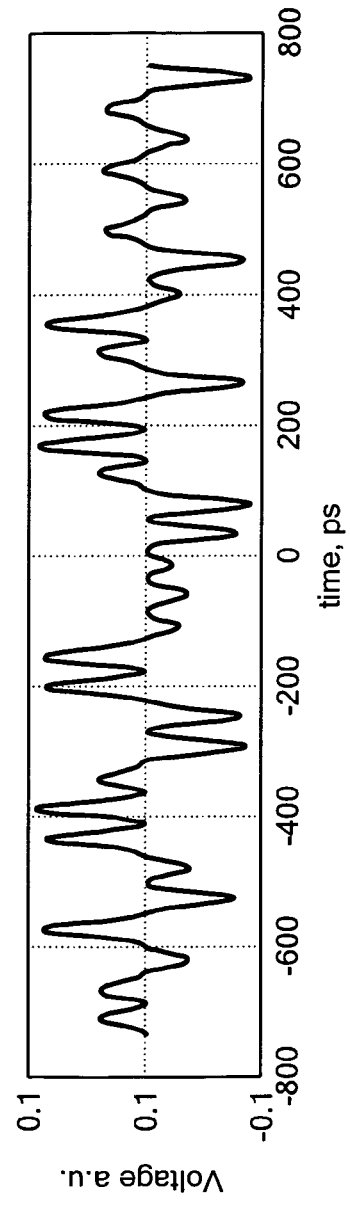
Figure 11C:
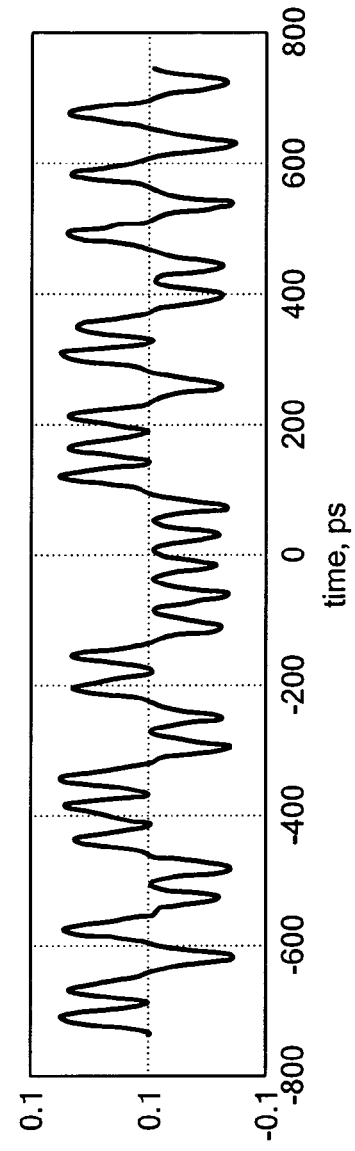

FIGS. 11a-11c illustrate the output signals at one of balanced detectors 107, 108. FIG. 11a corresponds to an incorrect phase shift setting of 0 or $\pi$, resulting in cancellation of some of the signal bits and increased magnitude of other signal bits. FIG. 11*b* illustrates a phase shift of $\pi/8$, where less cancellation takes place, but the phase shift is not optimal. FIG. 11*c* illustrates the desired phase shift of $\pi/4$ and the addition of signal bits upon being recombined to interfere with each other. The output voltage peak intensity therefore provides a useful means for controlling phase shifters 105, 106 to produce the desired phase shift, which can be maintained with a fair amount of precision.

Figure 12A:
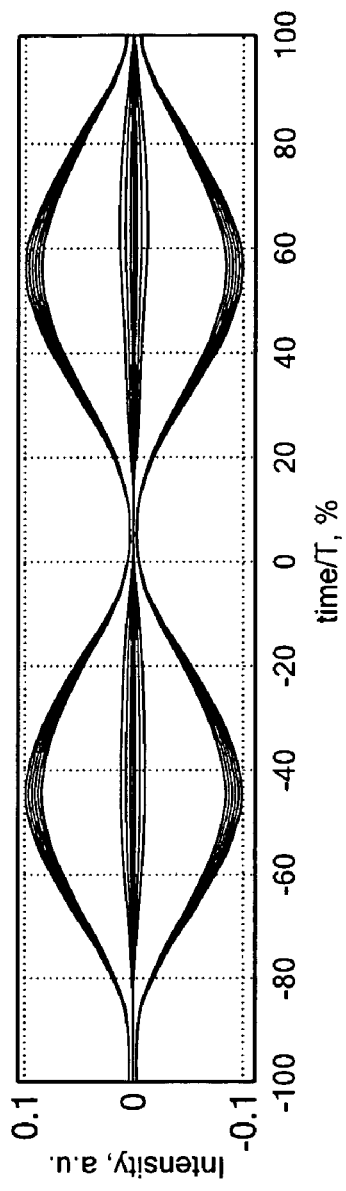
FIGS. 12a-12c are eye diagrams for the respective signal plots shown in FIGS. 11a-11c.
Figure 12B:
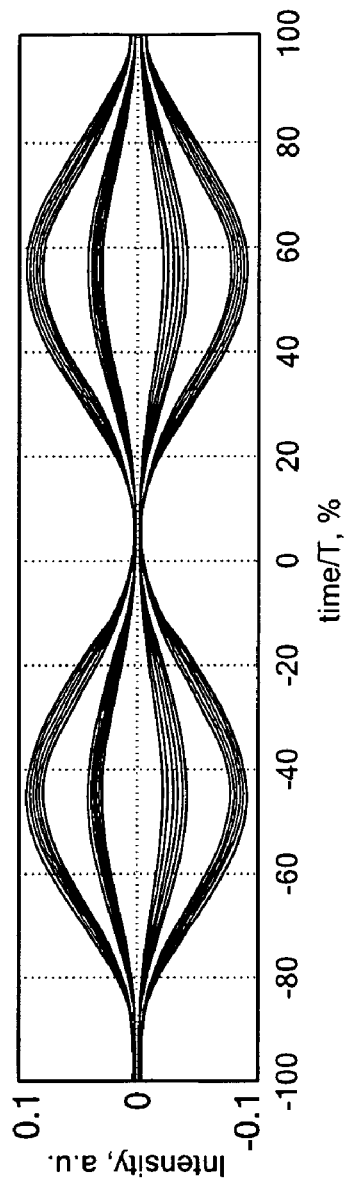
Figure 12C:
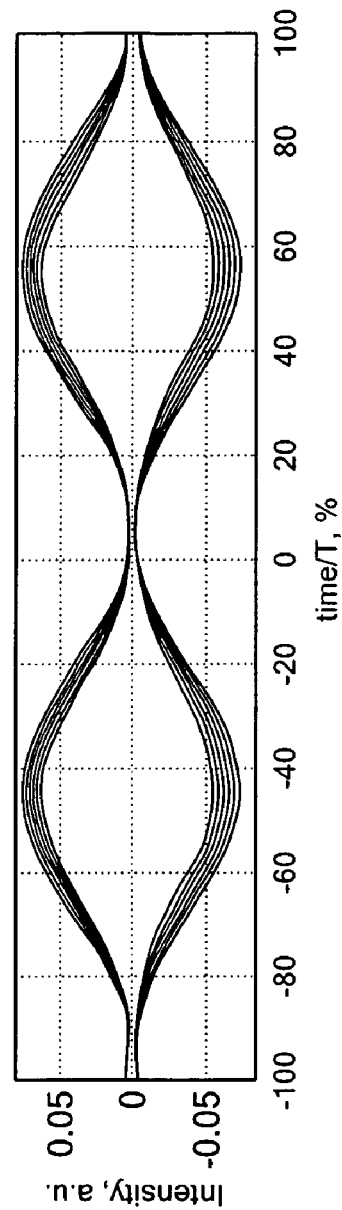

Referring to FIGS. 12*a*-12*c*, eye diagrams for different values of phase shift bias for DQPSK receiver 100 are illustrated. As can be seen, the eye diagrams of FIG. 12*c* are wide open with the desired phase shift bias of $\pi/4$.

Figure 13:
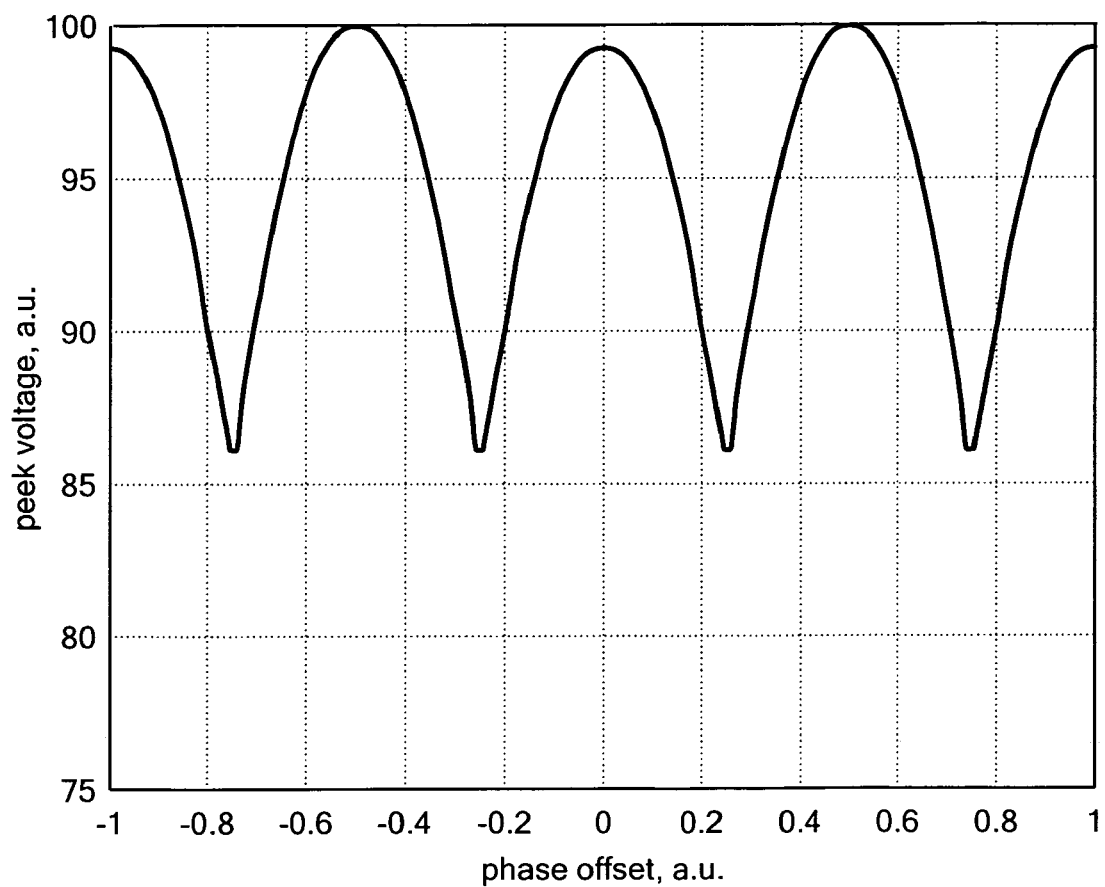
FIG. 13 is a graphical plot of output peak intensity voltage versus phase difference at an output of a DQPSK balanced detector.

Referring to FIG. 13, a graph of peak voltage versus phase offset for an output of one of balanced detectors 107, 108 is illustrated. The desired phase shift bias settings for DQPSK receiver 100 are $\pi/4$, $-\pi/4$ and $-\pi/4$. The desired operating points for phase shift bias correspond to minimums of the wave form plotted in FIG. 13. Accordingly, the feedback control loop based on output voltage peak intensity detection seeks to control phase shifters 105, 106 to minimize output voltage peak intensity. The four minima illustrated in FIG. 13 correspond to non-inverted and inverted data, the use of either of which can be chosen during calibration or device initialization.

Figure 14:
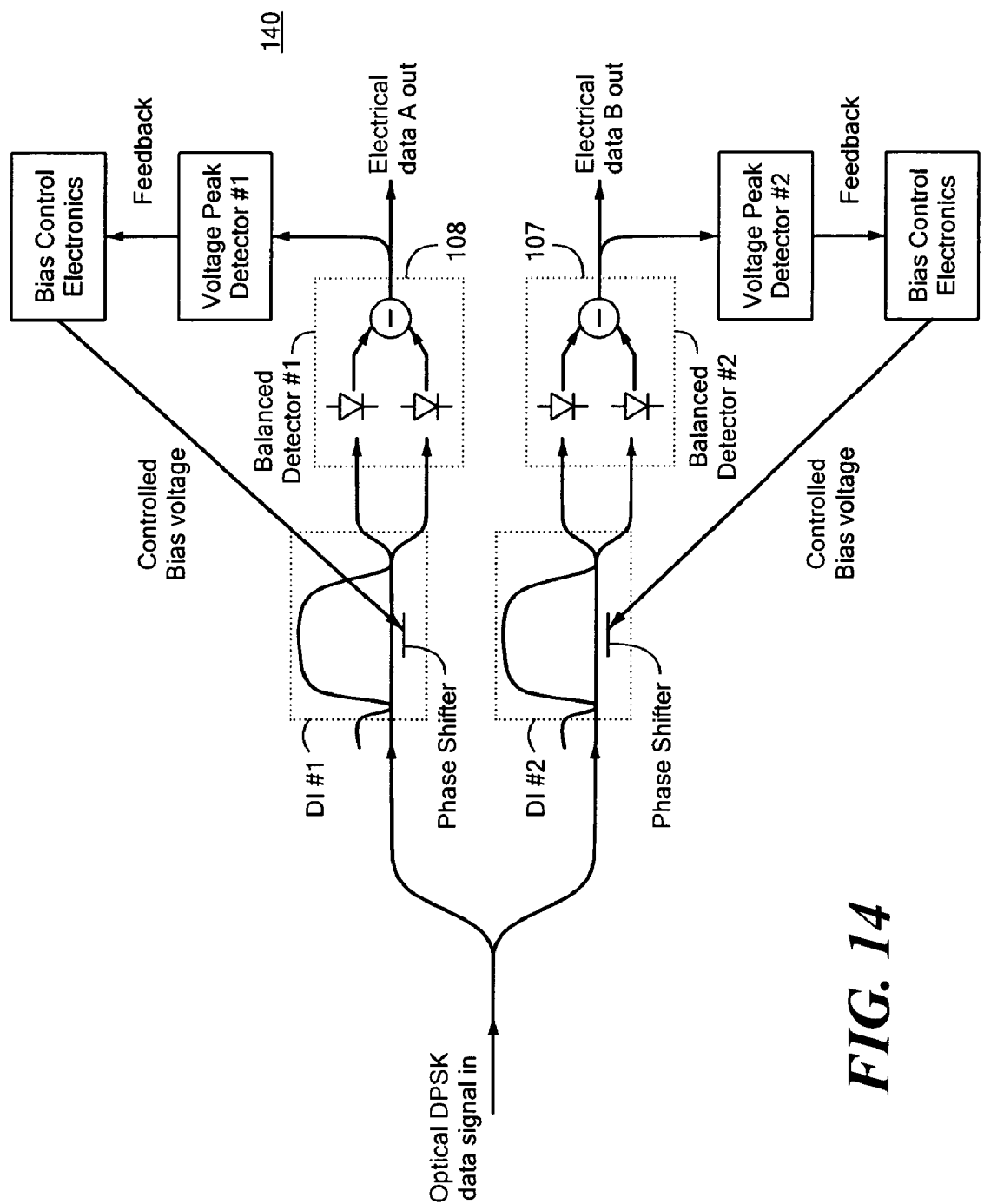
FIG. 14 is a schematic block diagram of a DQPSK receiver with feedback signals taken from a photodiode in each balanced detector.

Referring now to FIGS. 14-17, DQPSK receivers with various techniques for detecting peak signal intensity are illustrated. In FIG. 14, one arm of balanced detectors 107, 108 is used to obtain a voltage peak intensity indication. The output is taken from one of the 2 photodiodes in balanced detectors 107, 108 to determine output voltage peak intensity.

Figure 15:
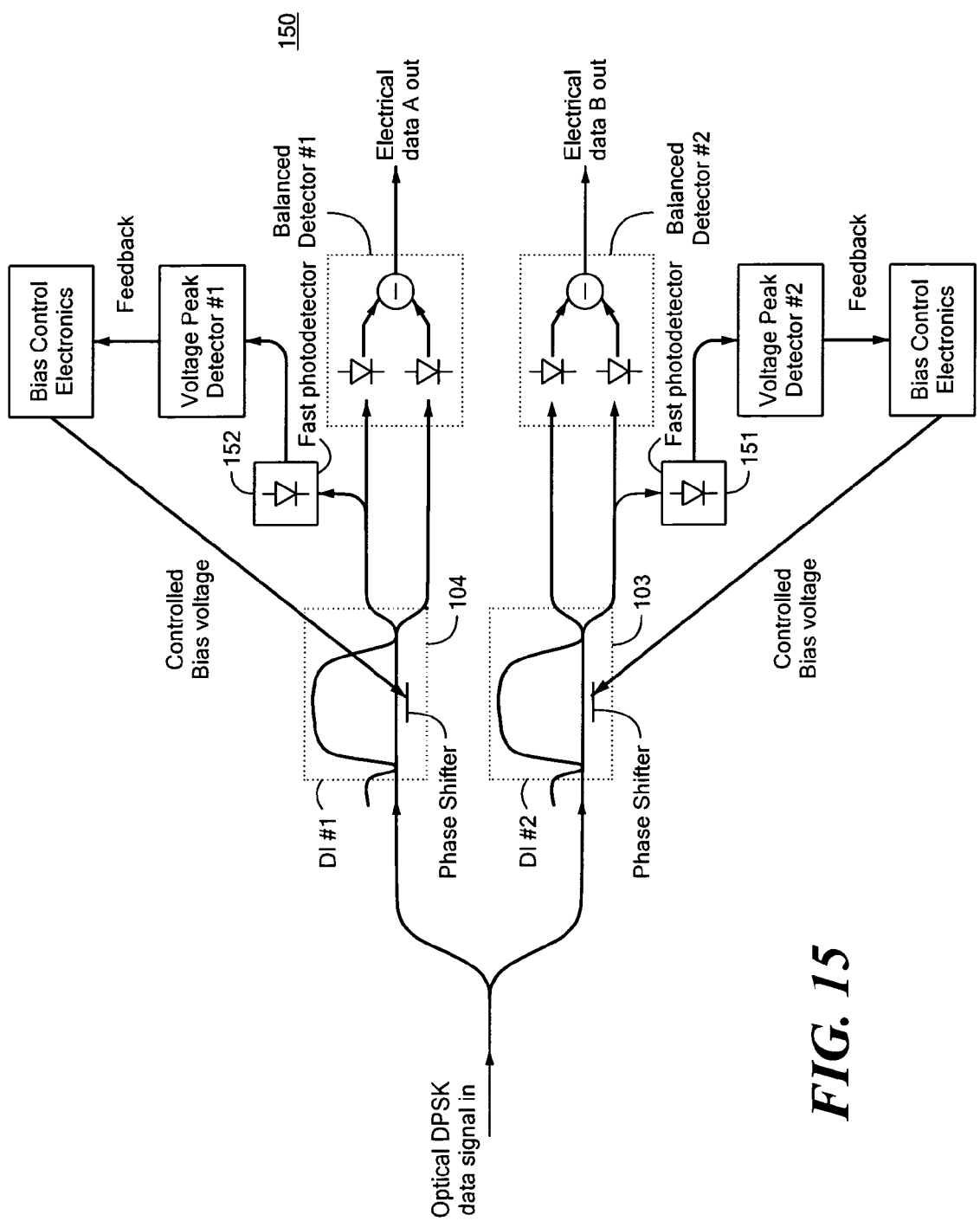
FIG. 15 is a schematic block diagram of a DQPSK receiver with feedback signals taken from an optical output of a delay interferometer.

Referring to FIG. 15, a single path of the optical output of DI 103, 104 in a receiver 150 is supplied to a fast photodetector 151, 152, respectively. The fast photodetector used in receiver 150 for each of DI 103, 104 can provide a faster response time for the control loop to obtain a fine phase adjustment. The use of a fast photodetector also permits implementation of the present invention without modifying existing receiver components.

Figure 16:
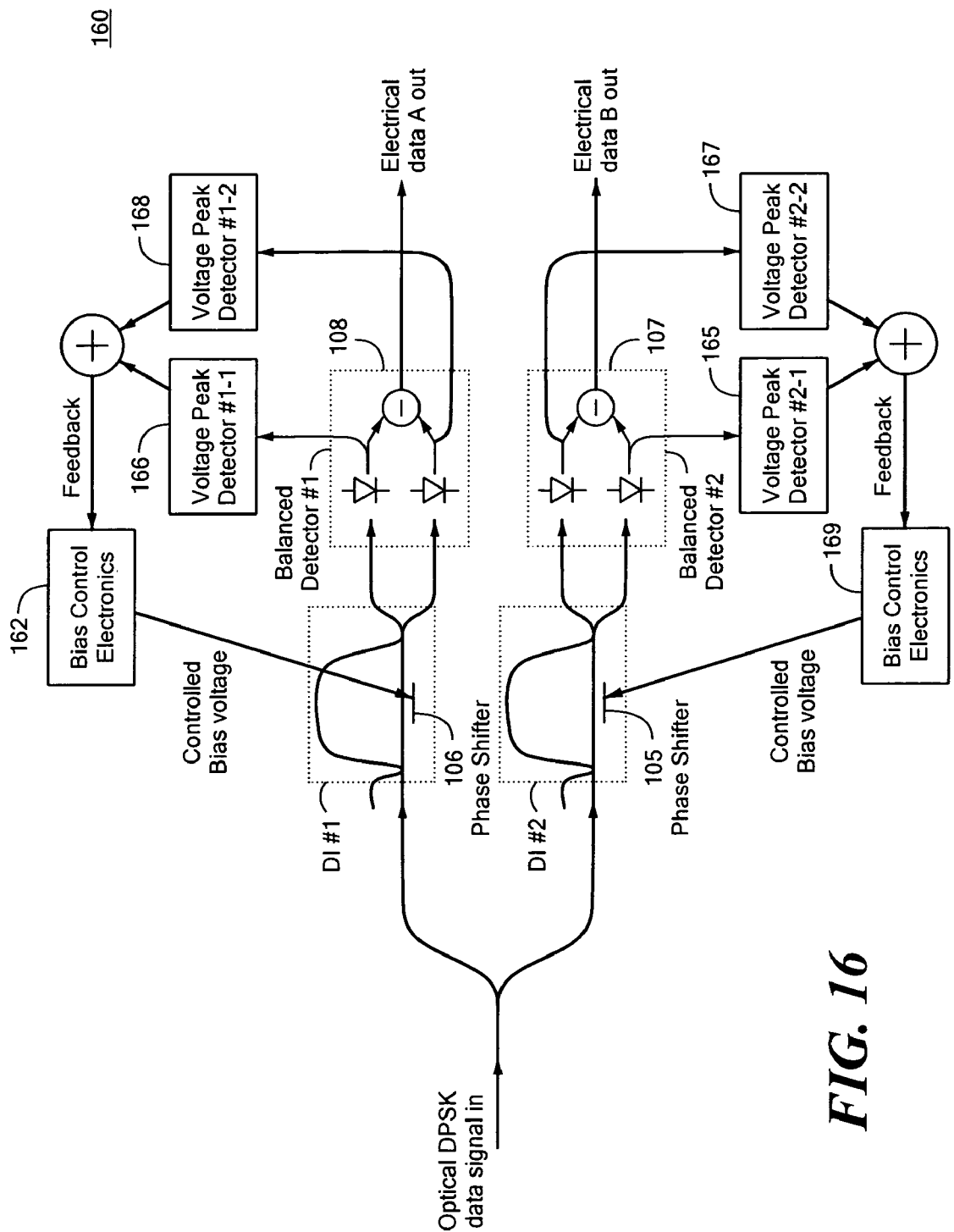
FIG. 16 is a schematic block diagram of a DQPSK receiver with feedback signals taken from two photodiodes in each of the balanced detectors.

Referring to FIG. 16, a receiver 160 includes output voltage peak detection in both paths of balanced detectors 107, 108. The output voltage of each path is supplied to a voltage peak intensity detector. The output of the voltage peak intensity detector is summed to produce the proportional signal provided to a bias control 162, 169. For example, the output of voltage peak intensity detector 165 and 167 is summed and applied to a bias control 169 to control phase shifter 105. By providing two feedback signals for each balanced detector 107, 108, greater feedback signal graduations or granularity are available. The peak intensity signals generated in voltage peak detectors 165, 167 and 166, 168 add together to produce a greater amplitude feedback signal that produces enhanced control of phase shifters 105, 106, respectively.

Figure 17:
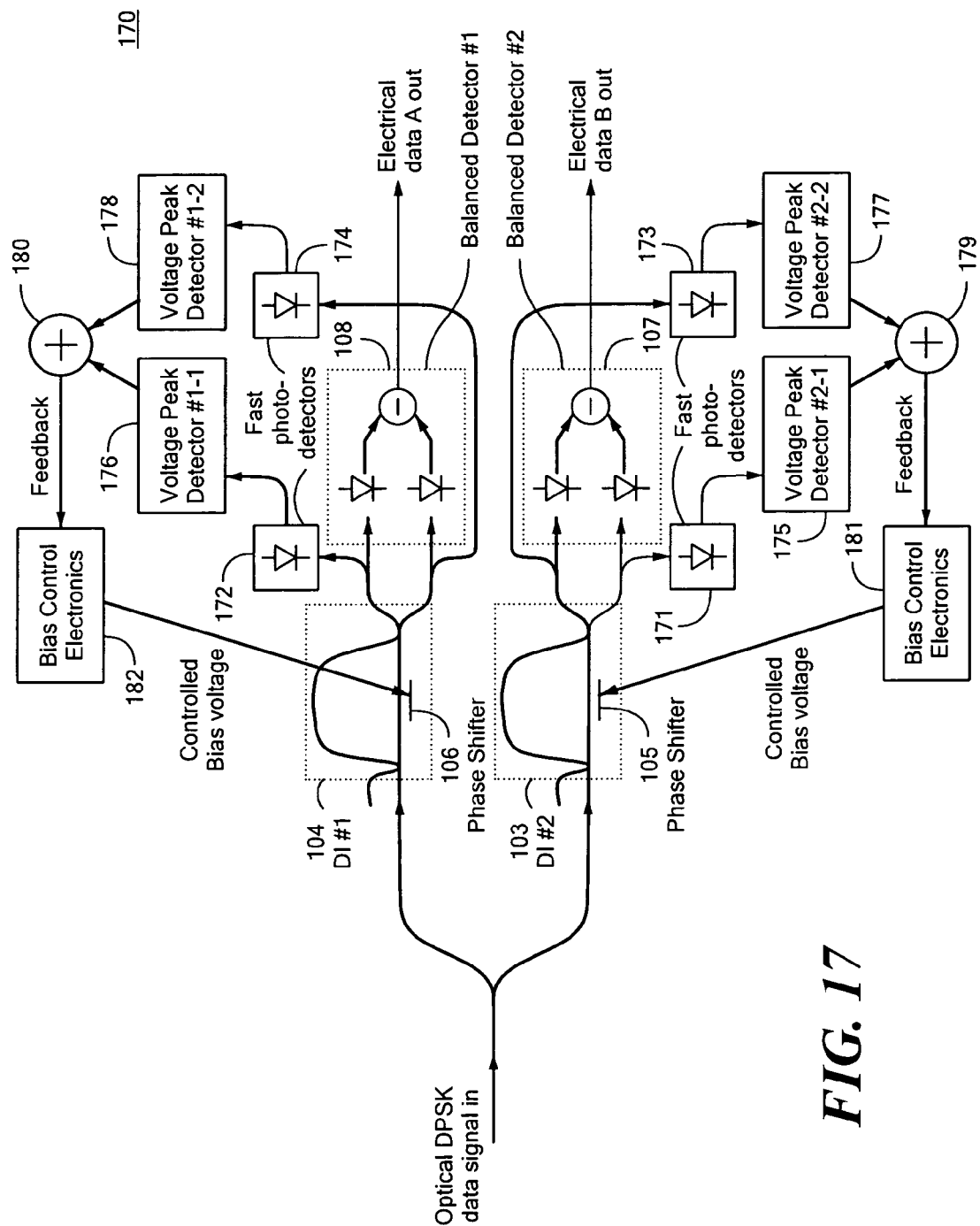
FIG. 17 is a schematic block diagram of a DQPSK receiver with feedback signals taken from two optical outputs at each of the delay interferometers.

Referring to FIG. 17, receiver 170 detects signal peak intensity from feedback taken in both optical paths in each of balanced detectors 107, 108. The feedback is taken before the PIN diodes in balanced detectors 107, 108, so that an optical signal is processed for feedback purposes. Fast photodetectors 171-174 convert the optical signals that are output from DIs 103, 104 into a voltage applied to voltage peak intensity detectors 175-178, respectively. Summing junctions 179, 180 sum the output of voltage peak intensity detectors 175, 177 and 176, 178, respectively, with the summed voltage signal being applied to a bias control 181, 182. Bias control 181 and 182 control phase shifters 105, 106 to maintain the desired phase difference in DIs 103, 104 based on minimizing the peak signal intensity of the feedback signal. One advantage provided by this configuration is to permit the present invention to be applied to existing systems without modifying the system components, such as DIs 103, 104 or balanced detectors 107, 108.

It is also possible to use an optical signal peak intensity detector without having to convert feedback signals to electrical form. Such a detector can provide faster control loop response and improved stability control.

While a control scheme for stabilizing a phase difference in optical transmitters and receivers based on peak signal intensity has been described, additional or alternate control criteria are available. For example, a feedback signal may be generated that is proportional to a data error rate in a Forward Error Correction (FEC) IC, for example. The optical transmitter or receiver control loops use the proportional signal derived from the FEC to drive the data error rate to a minimum. In the cases where two DIs are used in the optical device, control loops using the FEC are active in different time slots to avoid interference with each other. The time slot configuration may be a Time Division Multiplexing (TDM) scheme, as previously described.

It will be appreciated by those of ordinary skill in the art that further modifications to and variations of the above-described system and method may be made without departing from the inventive concepts disclosed herein. Accordingly, the invention should not be viewed as limited except as by the scope and spirit of the appended claims.

What is claimed is:

1. In an optical communication system, a method for controlling an optical transmitter having at least two optical paths each passing through an optical modulator and being configured to carry an optical data signal, comprising:
    combining two or more of the optical data signals to produce at least one resultant signal having a plurality of bits, each of the bits having a peak intensity value;
    detecting a maximum of the peak intensity values of the bits of the at least one resultant signal; and
    adjusting a phase difference between the optical data signals in response to the detected maximum of the peak intensity values to influence the peak intensity values of the bits of the at least one resultant signal to achieve a predetermined characteristic.

2. The method according to claim 1, further comprising adjusting the phase difference between the optical data signals to obtain one or more of a minimum or a maximum of the detected maximum of the peak intensity values of the at least one resultant signal.

3. The method according to claim 1, further comprising employing the method to control the optical modulator in one or more of a DPSK or DQPSK optical transmitter.

4. The method according to claim 3, further comprising employing one or more of RZ or NRZ modulation in the optical transmitter.

5. The method according to claim 1, further comprising converting a portion of the at least one resultant signal to an electrical signal representative of the maximum of the peak intensity values of the at least one resultant signal.

6. The method according to claim 5, further comprising detecting a maximum of peak intensity values of one or more of RF power or RF voltage of the electrical signal.

7. In an optical communication system, a method for controlling an optical receiver having an optical demodulator with at least two optical paths, each of the at least two optical paths being configured to carry an optical data signal, the method comprising:

combining the optical data signals from the at least two optical paths to produce at least one resultant optical signal having a plurality of bits, each of the bits having a peak intensity value;

detecting a maximum of the peak intensity of the bits of the at least one resultant optical signal; and adjusting a phase difference between the optical data signals in the at least two optical paths in response to the detected maximum of the peak intensity values to influence the peak intensity values of the bits of the at least one resultant optical signal to achieve a predetermined characteristic.

8. The method according to claim 7, further comprising adjusting the phase difference between the optical data signals in the at least two optical paths to obtain one or more of a minimum or a maximum of the detected maximum of the peak intensity values for the at least one resultant optical signal.

9. The method according to claim 7, further comprising employing the method to control the optical demodulator in one or more of a DPSK or a DQPSK optical receiver.

10. The method according to claim 9, further comprising employing one or more of RZ or NRZ demodulation in the optical receiver.

11. The method according to claim 7, further comprising converting a portion of the at least one resultant optical signal to an electrical signal representative of the maximum of the peak intensity values of the at least one resultant optical signal.

12. The method according to claim 11, further comprising detecting one or more of an RF power or an RF voltage of the electrical signal to permit monitoring of the maximum of the peak intensity values.

13. The method according to claim 11, further comprising:
combining the optical data signals to produce at least two resultant optical signals; and
applying the at least two resultant optical signals to a balanced detector to produce the electrical signal.

14. The method according to claim 7, further comprising:
detecting a data error rate of a received optical signal; and
adjusting the phase difference based on the data error rate.

15. An optical transmitter having at least two optical paths each passing through an optical modulator and being configured to carry an optical data signal having a plurality of bits, each of the bits having a peak intensity value, the optical transmitter comprising:
an interferometer having at least two optical inputs, each being coupled to an optical modulator to receive the optical data signal, and having at least one optical output and a phase shifter for adjusting a phase difference between the at least two optical inputs;
a peak intensity detector coupled to the at least one optical output for detecting a maximum of peak intensity values of bits at the at least one optical output; and
at least one bias control coupled to the peak intensity detector and the phase shifter and being configured to output a bias control signal to influence the phase shifter to adjust the phase difference between the at least two optical inputs in response to the maximum of the peak intensity values detectable by the peak intensity detector.

16. The optical transmitter according to claim 15, further comprising the at least one bias control being configured to influence the phase shifter to adjust the phase difference between the at least two optical inputs based on one or more of a minimum or a maximum of the detected maximum of the peak intensity values.

17. The optical transmitter according to claim 15, further comprising the optical transmitter being configured as one or more of a DPSK or DQPSK optical transmitter.

18. The optical transmitter according to claim 17, further comprising the optical transmitter being configured to employ one or more of an RZ or an NRZ modulation.

19. The optical transmitter according to claim 17, further comprising a photodetector coupled to the at least one optical output and operable to convert at least a portion of an output optical signal to an electrical signal.

20. The optical transmitter according to claim 19, wherein the peak intensity detector further comprises one or more of an RF power peak detector or an RF voltage peak detector coupled to the photodetector to receive the electrical signal.

21. An optical receiver, comprising:
an optical demodulator having at least two optical paths each configured for transmission of an optical data signal having a plurality of bits, the optical demodulator having at least one optical output and a phase shifter being coupled to one of the at least two optical paths to shift a phase of the optical data signal in the one optical path;
a peak intensity detector being coupled to the at least one optical output for detecting a maximum of the peak intensity values for the bits at the at least one optical output; and
at least one bias control coupled to the peak intensity detector and the phase shifter and being configured to output a bias control signal to influence the phase shifter to shift the phase of the optical data signal in the one optical path in response to a detected maximum of peak intensity values detected by the peak intensity detector.

22. The optical receiver according to claim 21, further comprising the at least one bias control being configured to influence the phase shifter to adjust the phase difference between the at least two optical inputs based on one or more of a minimum or a maximum of the detected maximum of the peak intensity values.

23. The optical receiver according to claim 21, further comprising the optical receiver being configured as one or more of a DPSK or DQPSK optical receiver.

24. The optical receiver according to claim 23, further comprising the optical receiver being configured to employ one or more of an RZ or an NRZ modulation.

25. The optical receiver according to claim 21, further comprising a photodetector coupled to the at least one optical output and operable to convert at least a portion of an output optical signal to an electrical signal.

26. The optical receiver according to claim 25, wherein the peak intensity detector further comprises one or more of an RF power peak detector or an RF voltage peak detector coupled to the photodetector to receive the electrical signal.

27. The optical receiver according to claim 21 wherein the optical demodulator has two optical outputs, the optical receiver further comprising:
a balanced detector having two optical inputs, each being coupled to the one of the two optical outputs, the balanced detector having an electrical signal output; and
the peak intensity detector being connected to the electrical signal output.

* * * * *